(12) United States Patent
Panandiker et al.

(10) Patent No.: US 9,095,787 B2
(45) Date of Patent: Aug. 4, 2015

(54) COMPOSITIONS COMPRISING ANTI-FOAMS

(71) Applicant: The Procter & Gamble Company, Cincinnati, OH (US)

(72) Inventors: Rajan Keshav Panandiker, West Chester, OH (US); Bernard William Kluesener, Harrison, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 30 days.

(21) Appl. No.: 14/059,476

(22) Filed: Oct. 22, 2013

(65) Prior Publication Data

US 2014/0113851 A1   Apr. 24, 2014

Related U.S. Application Data

(60) Provisional application No. 61/717,779, filed on Oct. 24, 2012.

(51) Int. Cl.

| *C11D 9/36* | (2006.01) |
| *B01D 19/04* | (2006.01) |
| *C11D 3/00* | (2006.01) |
| *C11D 3/37* | (2006.01) |
| *C11D 3/12* | (2006.01) |

(52) U.S. Cl.
CPC ........ *B01D 19/0409* (2013.01); *B01D 19/0431* (2013.01); *C11D 3/0026* (2013.01); *C11D 3/124* (2013.01); *C11D 3/373* (2013.01)

(58) Field of Classification Search
CPC .... C11D 3/0026; C11D 3/373; C11D 3/3738; C11D 9/225; C11D 9/36
See application file for complete search history.

(56) References Cited

U.S. PATENT DOCUMENTS

| 4,248,993 A * | 2/1981 | Takago ............................ 528/38 |
| 4,396,524 A | 8/1983 | Hempel et al. |
| 4,430,243 A | 2/1984 | Bragg |
| 4,472,562 A * | 9/1984 | Shirahata ........................ 528/15 |
| 4,477,371 A * | 10/1984 | Huber et al. ................... 516/121 |
| 4,740,055 A * | 4/1988 | Kanda et al. .................. 385/141 |
| 5,576,282 A | 11/1996 | Miracle et al. |
| 5,595,967 A | 1/1997 | Miracle et al. |
| 5,597,936 A | 1/1997 | Perkins et al. |
| 6,159,918 A | 12/2000 | Bae-Lee et al. |
| 6,225,464 B1 | 5/2001 | Hiler, II et al. |
| 6,306,812 B1 | 10/2001 | Perkins et al. |
| 6,326,348 B1 | 12/2001 | Vinson et al. |
| 7,169,741 B2 | 1/2007 | Barry et al. |
| 7,208,459 B2 | 4/2007 | Sadlowski et al. |
| 7,297,674 B2 | 11/2007 | Hines |
| 7,619,043 B2 | 11/2009 | Rautschek et al. |
| 7,686,892 B2 | 3/2010 | Smets et al. |
| 7,909,890 B2 | 3/2011 | Kramer et al. |
| 8,138,222 B2 | 3/2012 | Valenti et al. |
| 8,268,016 B2 | 9/2012 | Batchelor et al. |
| 2005/0130864 A1 | 6/2005 | Ouwendijk-Vrijenhoek et al. |
| 2008/0021152 A1 | 1/2008 | Rautschek et al. |
| 2008/0034511 A1 | 2/2008 | Batchelor et al. |
| 2009/0105395 A1 * | 4/2009 | Kamata et al. ................ 524/502 |
| 2012/0090102 A1 | 4/2012 | Batchelor et al. |
| 2012/0108476 A1 * | 5/2012 | Morcos et al. ................ 508/206 |
| 2012/0129752 A1 | 5/2012 | Stenger et al. |
| 2012/0225803 A1 | 9/2012 | Batchelor et al. |
| 2013/0327364 A1 * | 12/2013 | Delbrassinne et al. ......... 134/26 |
| 2014/0121149 A1 | 5/2014 | Panandiker et al. |

FOREIGN PATENT DOCUMENTS

| WO | WO 00/32601 A2 | 6/2000 |
| WO | WO 01/05874 A1 | 1/2001 |
| WO | WO 2008/087497 A1 | 7/2008 |
| WO | WO 2010/142503 A1 | 12/2010 |
| WO | WO 2011/011799 A2 | 1/2011 |
| WO | WO 2011/098355 A1 | 8/2011 |

OTHER PUBLICATIONS

International Search Report; International Application No. PCT/US2013/066053; date of mailing Feb. 27, 2014; 4 pages.
International Search Report; International Application No. PCT/US2013/066054; date of mailing Feb. 27, 2014; 4 pages.

* cited by examiner

*Primary Examiner* — Charles Boyer
(74) *Attorney, Agent, or Firm* — James F. McBride; Steven W. Miller

(57) ABSTRACT

The present application relates to cleaning and/or treatment compositions comprising anti-foams and methods of making and using such compositions. Such compositions encompass consumer products, cleaning and/or treatment compositions, fabric care compositions, or liquid laundry detergents that provide the desired suds profile via the addition of an anti-foamer, yet are stable.

17 Claims, No Drawings

COMPOSITIONS COMPRISING ANTI-FOAMS

FIELD OF THE INVENTION

The present application relates to cleaning and/or treatment compositions comprising anti-foams and methods of making and using such compositions.

BACKGROUND OF THE INVENTION

Cleaning and/or treatment compositions may employ materials that produce suds. In certain cleaning and/or treatment compositions, the level of suds is higher than desired. One manner of reducing suds is to add an antifoamer to the cleaning and/or treatment composition. Unfortunately, antifoamers may be incompatible with other compositional components or the situs that is treated thus leading to product instability. The compositions disclosed herein address in part, certain aspects of such stability issue.

SUMMARY OF THE INVENTION

The present application relates to cleaning and/or treatment compositions comprising anti-foams and methods of making and using such compositions. Such compositions encompass consumer products, cleaning and/or treatment compositions, fabric care compositions, or liquid laundry detergents that provide the desired suds profile via the addition of an antifoamer, yet are stable.

DETAILED DESCRIPTION OF THE INVENTION

Definitions

As used herein "consumer product" means baby care, beauty care, fabric & home care, family care, feminine care, health care, snack and/or beverage products or devices intended to be used or consumed in the form in which it is sold, and not intended for subsequent commercial manufacture or modification. Such products include but are not limited to diapers, bibs, wipes; products for and/or methods relating to treating hair (human, dog, and/or cat), including, bleaching, coloring, dyeing, conditioning, shampooing, styling; deodorants and antiperspirants; personal cleansing; cosmetics; skin care including application of creams, lotions, and other topically applied products for consumer use; and shaving products, products for and/or methods relating to treating fabrics, hard surfaces and any other surfaces in the area of fabric and home care, including: air care, car care, dishwashing, fabric conditioning (including softening), laundry detergency, laundry and rinse additive and/or care, hard surface cleaning and/or treatment, and other cleaning for consumer or institutional use; products and/or methods relating to bath tissue, facial tissue, paper handkerchiefs, and/or paper towels; products and/or methods relating to oral care including toothpastes, tooth gels, tooth rinses, denture adhesives, tooth whitening; over-the-counter health care including pain relievers, pet health and nutrition, and water purification.

As used herein, the term "cleaning and/or treatment composition" includes, unless otherwise indicated, granular or powder-form all-purpose or "heavy-duty" washing agents, especially cleaning detergents; liquid, gel or paste-form all-purpose washing agents, especially the so-called heavy-duty liquid types; liquid fine-fabric detergents; hand dishwashing agents or light duty dishwashing agents, especially those of the high-foaming type; machine dishwashing agents, including the various tablet, granular, liquid and rinse-aid types for household and institutional use; liquid cleaning and disinfecting agents, including antibacterial hand-wash types, cleaning bars, mouthwashes, denture cleaners, dentifrice, car or carpet shampoos, bathroom cleaners; hair shampoos and hair-rinses; shower gels and foam baths and metal cleaners; as well as cleaning auxiliaries such as bleach additives and "stain-stick" or pre-treat types, substrate-laden products such as dryer added sheets, dry and wetted wipes and pads, nonwoven substrates, and sponges; as well as sprays and mists.

As used herein, the term "fabric care composition" includes, unless otherwise indicated, fabric softening compositions, fabric enhancing compositions, fabric freshening compositions and combinations thereof.

As used herein, the articles "a" and "an" when used in a claim, are understood to mean one or more of what is claimed or described.

As used herein, the terms "include", "includes" and "including" are meant to be synonymous with the phrase "including but not limited to".

As used herein, the term "solid" means granular, powder, bar and tablet product forms. As used herein, the term "situs" includes paper products, fabrics, garments, hard surfaces, hair and skin.

As used herein, the term "heteroatom" takes its ordinary, customary meaning, and thus includes N, O, S, P, Cl, Br, and I.

Unless otherwise noted, all component or composition levels are in reference to the active portion of that component or composition, and are exclusive of impurities, for example, residual solvents or by-products, which may be present in commercially available sources of such components or compositions.

All percentages and ratios are calculated by weight unless otherwise indicated. All percentages and ratios are calculated based on the total composition unless otherwise indicated.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Compositions

In one aspect, a composition comprising a polymer, having a number average molecular weight of from about 200 Daltons to about 10,000,000 Daltons, from about 500 Daltons to about 10,000,000 Daltons, from about 1,000 Daltons to about 10,000,000 Daltons, or from about 1,500 Daltons to about 10,000,000 Daltons, that comprises from about 50 mol % to about 100 mol %, or from about 60 mol % to about 100 mol %, or from about 70 mol % to about 100 mol %, or from about 80 mol % to about 100 mol %, or from about 90 mol % to about 100 mol % units of Formula (I) below, $$R_a(R^1O)_bR^2_cSiO_{(4-a-b-c)/2}$$ <span style="float:right">Formula (I)</span> wherein:
a) each R is independently selected from: H, a monovalent, SiC-bonded, optionally substituted, aliphatic hydrocarbon radical that optionally comprises a heteroatom, or an aromatic hydrocarbon radical covalently attached to silicon via aliphatic groups, in one aspect each R is independently selected from: H, a monovalent, SiC-bonded, optionally substituted, $C_1$-$C_{50}$ aliphatic hydrocarbon radical that optionally comprises a heteroatom, or a $C_6$-$C_{16}$ aromatic hydrocarbon radical covalently attached to silicon via aliphatic groups;
b) each $R^1$ is independently selected from: H, or a monovalent, optionally substituted aliphatic hydrocarbon radical, that optionally comprises a heteroatom, in one aspect each $R^1$ is independently selected from: H, or a monovalent, optionally substituted $C_1$-$C_{50}$ aliphatic hydrocarbon radical, that optionally comprises a heteroatom;
c) each $R^2$ is a monovalent, optionally substituted, aromatic hydrocarbon radical which is attached to the silicon atom via a carbon ring atom, in one aspect each $R^2$ is a monovalent, optionally substituted, $C_6$-$C_{16}$ aromatic hydrocarbon radical which is attached to the silicon atom via a carbon ring atom;
d) the index a is 0, 1, 2 or 3;
e) the index b is 0, 1, 2 or 3;
f) the index c is 0, 1, 2 or 3; and
optionally a filler and a resin;
with the proviso for said polymer that for each of said polymer's Formula I units the sum of indices a, b, and c is less than or equal to 3; in 1-100%, 10-60%, or 20-40% of said polymer's Formula (I) units, c is other than 0; and in at least 50% of said polymer's Formula I units the sum of indices a, b, and c is 2.

In one aspect, said polymer's number average molecular weight is from about 200 Daltons to about 10,000,000 Daltons, from about 500 Daltons to about 1,000,000 Daltons, from about 1,000 Daltons to about 500,000 Daltons, or from about 1,500 Daltons to about 100,000 Daltons.

In one aspect of said composition, for:
a) each R group of said polymer:
 i) each monovalent, optionally substituted, aliphatic hydrocarbon radical that optionally comprises a heteroatom is independently selected from methyl, ethyl, n-propyl, isopropyl, n-butyl, isobutyl, tert-butyl, n-pentyl, isopentyl, neopentyl, tert-pentyl, hexyl, heptyl, octyl, isooctyl, nonyl, decyl, dodecyl, alkenyl, cycloalkyl, 3,3,3-trifluoro-n-propyl, cyanoethyl, glycidyloxy-n-propyl, polyalkylene glycol-n-propyl, amino-n-propyl, aminoethylamino-n-propyl, and methacryloyloxy-n-propyl,
 ii) each aromatic hydrocarbon radical covalently attached to silicon via aliphatic groups is independently selected from benzyl, phenylethyl, or 2-phenylpropyl,
b) each $R^1$ group of said polymer each monovalent, optionally substituted, aliphatic hydrocarbon radical that optionally comprises a heteroatom is independently selected from methyl, ethyl, n-propyl, isopropyl, n-butyl, isobutyl, tert-butyl, n-pentyl, isopentyl, neopentyl, tert-pentyl, hexyl, heptyl, octyl, isooctyl, nonyl, decyl, dodecyl, alkenyl, cycloalkyl, 3,3,3-trifluoro-n-propyl, cyanoethyl, glycidyloxy-n-propyl, polyalkylene glycol-n-propyl, amino-n-propyl, aminoethylamino-n-propyl, and methacryloyloxy-n-propyl,
c) each $R^2$ group of said polymer is independently selected from phenyl, substituted phenyl, naphthyl, or anthracyl.

In one aspect of said composition, for each $R^2$ group of said polymer is independently selected from phenyl, tolyl, xylyl, cumyl, naphthyl or anthracyl.

In one aspect of said composition, for each $R^2$ group of said polymer is independently selected from phenyl or tolyl.

In one aspect of said composition, the index b is 0 or 1, and the index c is 0, 1, or 2.

In one aspect of said composition, said composition comprises a resin and a filler, said filler having a BET surface area of 20 to 1000 m²/g, a particle size of less than 10 μm and an agglomerate size of less than 100 μm.

In one aspect of said composition, said filler is selected from the group consisting of silica, titanium dioxide, aluminum oxide, metal soaps, quartz flour, PTFE powders, fatty acid amides, ethylenebisstearamide, or hydrophobic polyurethanes.

In one aspect of said composition said filler comprises hydrophobic, precipitated silica and/or hydrophobic, fumed silica.

In one aspect of said composition, viscosity, at a shear rate of 20 sec at 25° C., of from about 10 cPs to about 50,000 cPs and comprising from about 1% to about 60%, from about 3% to about 50%, from about 5% to about 40% or from about 8% to about 30% of a surfactant selected from the group consisting of anionic surfactant, cationic surfactant, nonionic surfactant, zwitterionic surfactant, ampholytic surfactant and mixtures thereof and optionally one or more adjuncts are selected from the group consisting of builders, chelating agents, dye transfer inhibiting agents, dispersants, enzymes, and enzyme stabilizers, catalytic materials, bleach, bleach activators, polymeric dispersing agents, clay soil removal/anti-redeposition agents, brighteners, suds suppressors, dyes, hueing agents, UV absorbers, perfume, perfume delivery systems, structure elasticizing agents, thickeners/structurants, fabric softeners, carriers, hydrotropes, processing aids and/or pigments.

In one aspect of said composition, said composition comprises an anionic surfactant.

In one aspect of said composition, said anionic surfactant is selected from the group consisting of a $C_{11}$-$C_{18}$ alkyl benzene sulfonate surfactant; a $C_{10}$-$C_{20}$ alkyl sulfate surfactant; a $C_{10}$-$C_{18}$ alkyl alkoxy sulfate surfactant, said $C_{10}$-$C_{18}$ alkyl alkoxy sulfate surfactant having an average degree of alkoxylation of from 1 to 30 and the alkoxy comprises a $C_1$-$C_4$ chain, and mixtures thereof.

In one aspect of said composition, said one or more adjuncts are selected from the group consisting of builders, chelating agents, dye transfer inhibiting agents, dispersants, enzymes, and enzyme stabilizers, catalytic materials, bleach, bleach activators, polymeric dispersing agents, clay soil removal/anti-redeposition agents, brighteners, suds suppressors, dyes, hueing agents, UV absorbers, perfume, perfume delivery systems, structure elasticizing agents, thickeners/structurants, fabric softeners, carriers, hydrotropes, processing aids and/or pigments.

In one aspect of said composition, said composition is a antifoam composition that comprises a filler and a resin and said resin comprising units of Formula (II) below:

$$R^3{}_d(R^4O)_e SiO_{(4-d-e)/2} \qquad \text{Formula (II)}$$

wherein:
a) each $R^3$ is independently selected from H, a monovalent, SiC-bonded, optionally substituted, aliphatic hydrocarbon radical that optionally comprises a heteroatom, or an aromatic hydrocarbon radical covalently attached to silicon via aliphatic groups, in one aspect, each $R^3$ is independently selected from H, a monovalent, SiC-bonded, optionally substituted, $C_1$-$C_{50}$ aliphatic hydrocarbon radical that optionally comprises a heteroatom, or a $C_6$-$C_{16}$ aromatic hydrocarbon radical covalently attached to silicon via aliphatic groups;
b) each $R^4$ is independently selected from H, or a monovalent, optionally substituted aliphatic hydrocarbon radical, that optionally comprises a heteroatom, in one aspect, each $R^4$ is independently selected from H, or a monovalent, optionally substituted $C_1$-$C_{50}$ aliphatic hydrocarbon radical, that optionally comprises a heteroatom;

c) the index d is 0, 1, 2 or 3; and
d) the index e is 0, 1, 2 or 3;
  with the proviso that the sum of the indices d and e is less than or equal to 3 and in less than 50% of all of the units of the Formula (II) in the organopolysiloxane resin the sum of the indices d and e is 2.

In one aspect, said composition is a consumer product.

In one aspect, said composition is a cleaning and/or treatment composition.

In one aspect, said composition is a fabric care composition.

In one aspect, said composition is a liquid laundry detergent.

In one aspect, a composition comprising any combinations of the parameters and/or characteristics disclosed above is disclosed.

Process of Making Compositions

In one aspect, a process of making the composition disclosed herein is disclosed, said process comprising combining a surfactant, optionally one or more adjunct ingredients, and from about 0.001% to about 2%, or from about 0.005% to about 1%, or from about 0.01% to about 0.75%, or from about 0.05% to about 0.5% of an anti-foam composition disclosed herein comprising a polymer having a number average molecular weight of from about 200 Daltons to about 10,000,000 Daltons, from about 500 Daltons to about 10,000,000 Daltons, from about 1,000 Daltons to about 10,000,000 Daltons, or from about 1,500 Daltons to about 10,000,000 Daltons, that comprises from about 50 mol % to about 100 mol %, or from about 60 mol % to about 100 mol %, or from about 70 mol % to about 100 mol %, or from about 80 mol % to about 100 mol %, or from about 90 mol % to about 100 mol % units of Formula (I) below,

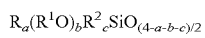   Formula (I)

wherein:
a) each R is independently selected from: H, a monovalent, SiC-bonded, optionally substituted, aliphatic hydrocarbon radical that optionally comprises a heteroatom, or an aromatic hydrocarbon radical covalently attached to silicon via aliphatic groups, in one aspect, each R is independently selected from: H, a monovalent, SiC-bonded, optionally substituted, $C_1$-$C_{50}$ aliphatic hydrocarbon radical that optionally comprises a heteroatom, or a $C_6$-$C_{16}$ aromatic hydrocarbon radical covalently attached to silicon via aliphatic groups;
b) each $R^1$ is independently selected from: H, or a monovalent, optionally substituted aliphatic hydrocarbon radical, that optionally comprises a heteroatom, in one aspect, each $R^1$ is independently selected from: H, or a monovalent, optionally substituted $C_1$-$C_{50}$ aliphatic hydrocarbon radical, that optionally comprises a heteroatom;
c) each $R^2$ is a monovalent, optionally substituted, aromatic hydrocarbon radical which is attached to the silicon atom via a carbon ring atom, in one aspect, each $R^2$ is a monovalent, optionally substituted, $C_6$-$C_{16}$ aromatic hydrocarbon radical which is attached to the silicon atom via a carbon ring atom;
d) the index a is 0, 1, 2 or 3;
e) the index b is 0, 1, 2 or 3;
f) the index c is 0, 1, 2 or 3; and
optionally a filler and a resin; with the proviso for said polymer that for each of said polymer's Formula I units the sum of the indices a, b, and c is less than or equal to 3; in 1-100%, 10-60%, or 20-40% of said polymer's Formula I units, c is other than 0; and in at least 50% of said polymer's Formula I units the sum of the indices a, b, and c is 2.

In one aspect, said process, said polymer's number average molecular weight is from about 200 Daltons to about 10,000,000 Daltons, from about 500 Daltons to about 1,000,000 Daltons, from about 1,000 Daltons to about 500,000 Daltons, or from about 1,500 Daltons to about 100,000 Daltons.

Method of Using of Compositions

In one aspect, a method of treating and/or cleaning a situs is disclosed, said method comprising:
a) optionally washing and/or rinsing said situs;
b) contacting said situs with any of Applicants' compositions, and
c) optionally washing and/or rinsing said situs.

In one aspect, said situs is dried either line dried and/or machine dried after said treating and/or cleaning.

Adjunct Materials

While not essential for each consumer product embodiment of the present invention, the non-limiting list of adjuncts illustrated hereinafter are suitable for use in the instant consumer products and may be desirably incorporated in certain embodiments of the invention, for example to assist or enhance performance, for treatment of the substrate to be cleaned, or to modify the aesthetics of the composition as is the case with perfumes, colorants, dyes or the like. The precise nature of these additional components, and levels of incorporation thereof, will depend on the physical form of the composition and the nature of the operation for which it is to be used. Suitable adjunct materials include, but are not limited to, solvents, builders, chelating agents, dye transfer inhibiting agents, dispersants, enzymes, and enzyme stabilizers, catalytic materials, bleach activators, polymeric dispersing agents, clay soil removal/anti-redeposition agents, brighteners, suds suppressors, dyes, UV absorbers, additional perfume and perfume delivery systems, structure elasticizing agents, thickeners/structurants, fabric softeners, carriers, hydrotropes, processing aids and/or pigments. In addition to the disclosure below, suitable examples of such other adjuncts and levels of use are found in U.S. Pat. Nos. 5,576,282, 6,306,812 B1 and 6,326,348 B1 that are incorporated by reference.

As stated, the adjunct ingredients are not essential for each consumer product embodiment of the present invention. Thus, certain embodiments of Applicants' compositions do not contain one or more of the following adjuncts materials: bleach activators, solvents, builders, chelating agents, dye transfer inhibiting agents, dispersants, enzymes, and enzyme stabilizers, catalytic metal complexes, polymeric dispersing agents, clay and soil removal/anti-redeposition agents, brighteners, suds suppressors, dyes, additional perfumes and perfume delivery systems, structure elasticizing agents, thickeners/structurants, fabric softeners, carriers, hydrotropes, processing aids and/or pigments. However, when one or more adjuncts is present, such one or more adjuncts may be present as detailed below.

Solvents—suitable solvents include, but are not limited to, water, alcohol, paraffins, glycols, glycerols, and mixtures thereof.

Builders—The compositions of the present invention can comprise one or more detergent builders or builder systems. When present, the compositions will typically comprise at least about 1% builder, or from about 5% or 10% to about 80%, 50%, or even 30% by weight, of said builder. Builders include, but are not limited to, the alkali metal, ammonium and alkanolammonium salts of polyphosphates, alkali metal silicates, alkaline earth and alkali metal carbonates, aluminosilicate builders, polycarboxylate compounds, ether hydroxypolycarboxylates, copolymers of maleic anhydride with ethylene or vinyl methyl ether, 1,3,5-trihydroxybenzene-2,4,6-trisulphonic acid, and carboxymethyl-oxysuccinic acid, the various alkali metal, ammonium and substituted ammonium salts of polyacetic acids such as ethylenediamine tetraacetic acid and nitrilotriacetic acid, as well as polycarboxylates such as mellitic acid, succinic acid, oxydisuccinic acid, polymaleic acid, benzene 1,3,5-tricarboxylic acid, carboxymethyloxysuccinic acid, and soluble salts thereof.

Chelating Agents—The compositions herein may also optionally contain one or more copper, iron and/or manganese chelating agents. If utilized, chelating agents will generally comprise from about 0.1% by weight of the compositions herein to about 15%, or even from about 3.0% to about 15% by weight of the compositions herein.

Dye Transfer Inhibiting Agents—The compositions of the present invention may also include one or more dye transfer inhibiting agents. Suitable polymeric dye transfer inhibiting agents include, but are not limited to, polyvinylpyrrolidone polymers, polyamine N-oxide polymers, copolymers of N-vinylpyrrolidone and N-vinylimidazole, polyvinyloxazolidones and polyvinylimidazoles or mixtures thereof. When present in the compositions herein, the dye transfer inhibiting agents are present at levels from about 0.0001%, from about 0.01%, from about 0.05% by weight of the cleaning compositions to about 10%, about 2%, or even about 1% by weight of the cleaning compositions.

Dispersants—The compositions of the present invention can also contain dispersants. Suitable water-soluble organic materials are the homo- or co-polymeric acids or their salts, in which the polycarboxylic acid may comprise at least two carboxyl radicals separated from each other by not more than two carbon atoms.

Enzymes—The compositions can comprise one or more detergent enzymes which provide cleaning performance and/or fabric care benefits. Examples of suitable enzymes include, but are not limited to, hemicellulases, peroxidases, proteases, cellulases, xylanases, lipases, phospholipases, esterases, cutinases, pectinases, keratanases, reductases, oxidases, phenoloxidases, lipoxygenases, ligninases, pullulanases, tannases, pentosanases, malanases, β-glucanases, arabinosidases, hyaluronidase, chondroitinase, laccase, and amylases, or mixtures thereof. A typical combination is a cocktail of conventional applicable enzymes like protease, lipase, cutinase and/or cellulase in conjunction with amylase.

Enzyme Stabilizers—Enzymes for use in compositions, for example, detergents can be stabilized by various techniques. The enzymes employed herein can be stabilized by the presence of water-soluble sources of calcium and/or magnesium ions in the finished compositions that provide such ions to the enzymes.

Fabric Hueing Agents—The composition may comprise a fabric hueing agent (sometimes referred to as shading, bluing or whitening agents). Typically the hueing agent provides a blue or violet shade to fabric. Hueing agents can be used either alone or in combination to create a specific shade of hueing and/or to shade different fabric types. This may be provided for example by mixing a red and green-blue dye to yield a blue or violet shade. Hueing agents may be selected from any known chemical class of dye, including but not limited to acridine, anthraquinone (including polycyclic quinones), azine, azo (e.g., monoazo, disazo, trisazo, tetrakisazo, polyazo), including premetallized azo, benzodifurane and benzodifuranone, carotenoid, coumarin, cyanine, diazahemicyanine, diphenylmethane, formazan, hemicyanine, indigoids, methane, naphthalimides, naphthoquinone, nitro and nitroso, oxazine, phthalocyanine, pyrazoles, stilbene, styryl, triarylmethane, triphenylmethane, xanthenes and mixtures thereof. Suitable fabric hueing agents include dyes, dye-clay conjugates, and organic and inorganic pigments. Suitable dyes include small molecule dyes and polymeric dyes. Suitable small molecule dyes include small molecule dyes selected from the group consisting of dyes falling into the Colour Index (C.I.) classifications of Direct, Basic, Reactive or hydrolysed Reactive, Solvent or Disperse dyes for example that are classified as Blue, Violet, Red, Green or Black, and provide the desired shade either alone or in combination. In another aspect, suitable small molecule dyes include small molecule dyes selected from the group consisting of Colour Index (Society of Dyers and Colourists, Bradford, UK) numbers Direct Violet dyes such as 9, 35, 48, 51, 66, and 99, Direct Blue dyes such as 1, 71, 80 and 279, Acid Red dyes such as 17, 73, 52, 88 and 150, Acid Violet dyes such as 15, 17, 24, 43, 49 and 50, Acid Blue dyes such as 15, 17, 25, 29, 40, 45, 75, 80, 83, 90 and 113, Acid Black dyes such as 1, Basic Violet dyes such as 1, 3, 4, 10 and 35, Basic Blue dyes such as 3, 16, 22, 47, 66, 75 and 159, Disperse or Solvent dyes such as those described in US 2008/034511 A1 or U.S. Pat. No. 8,268,016 B2, or dyes as disclosed in U.S. Pat. No. 7,208,459 B2, and mixtures thereof. In another aspect, suitable small molecule dyes include small molecule dyes selected from the group consisting of C. I. numbers Acid Violet 17, Direct Blue 71, Direct Violet 51, Direct Blue 1, Acid Red 88, Acid Red 150, Acid Blue 29, Acid Blue 113 or mixtures thereof.

Suitable polymeric dyes include polymeric dyes selected from the group consisting of polymers containing covalently bound (sometimes referred to as conjugated) chromogens, (dye-polymer conjugates), for example polymers with chromogens co-polymerized into the backbone of the polymer and mixtures thereof. Polymeric dyes include those described in WO2011/98355, US 2012/225803 A1, US 2012/090102 A1, U.S. Pat. No. 7,686,892 B2, and WO2010/142503.

In another aspect, suitable polymeric dyes include polymeric dyes selected from the group consisting of fabric-substantive colorants sold under the name of Liquitint® (Milliken, Spartanburg, S.C., USA), dye-polymer conjugates formed from at least one reactive dye and a polymer selected from the group consisting of polymers comprising a moiety selected from the group consisting of a hydroxyl moiety, a primary amine moiety, a secondary amine moiety, a thiol moiety and mixtures thereof. In still another aspect, suitable polymeric dyes include polymeric dyes selected from the group consisting of Liquitint® Violet CT, carboxymethyl cellulose (CMC) covalently bound to a reactive blue, reactive violet or reactive red dye such as CMC conjugated with C.I. Reactive Blue 19, sold by Megazyme, Wicklow, Ireland under the product name AZO-CM-CELLULOSE, product code S-ACMC, alkoxylated triphenyl-methane polymeric colourants, alkoxylated thiophene polymeric colourants, and mixtures thereof.

Preferred hueing dyes include the whitening agents found in WO 08/87497 A1, WO2011/011799 and US 2012/129752 A1. Preferred hueing agents for use in the present invention may be the preferred dyes disclosed in these references, including those selected from Examples 1-42 in Table 5 of WO2011/011799. Other preferred dyes are disclosed in U.S. Pat. No. 8,138,222. Other preferred dyes are disclosed in U.S. Pat. No. 7,909,890 B2.

Suitable dye clay conjugates include dye clay conjugates selected from the group comprising at least one cationic/basic dye and a smectite clay, and mixtures thereof. In another aspect, suitable dye clay conjugates include dye clay conjugates selected from the group consisting of one cationic/basic dye selected from the group consisting of C.I. Basic Yellow 1 through 108, C.I. Basic Orange 1 through 69, C.I. Basic Red 1 through 118, C.I. Basic Violet 1 through 51, C.I. Basic Blue 1 through 164, C.I. Basic Green 1 through 14, C.I. Basic Brown 1 through 23, CI Basic Black 1 through 11, and a clay selected from the group consisting of Montmorillonite clay, Hectorite clay, Saponite clay and mixtures thereof. In still another aspect, suitable dye clay conjugates include dye clay conjugates selected from the group consisting of: Montmorillonite Basic Blue B7 C.I. 42595 conjugate, Montmorillonite Basic Blue B9 C.I. 52015 conjugate, Montmorillonite Basic Violet V3 C.I. 42555 conjugate, Montmorillonite Basic Green G1 C.I. 42040 conjugate, Montmorillonite Basic Red R1 C.I. 45160 conjugate, Montmorillonite C.I. Basic Black 2 conjugate, Hectorite Basic Blue B7 C.I. 42595 conjugate, Hectorite Basic Blue B9 C.I. 52015 conjugate, Hectorite Basic Violet V3 C.I. 42555 conjugate, Hectorite Basic Green G1 C.I. 42040 conjugate, Hectorite Basic Red R1 C.I. 45160 conjugate, Hectorite C.I. Basic Black 2 conjugate, Saponite Basic Blue B7 C.I. 42595 conjugate, Saponite Basic Blue B9 C.I. 52015 conjugate, Saponite Basic Violet V3 C.I. 42555 conjugate, Saponite Basic Green G1 C.I. 42040 conjugate, Saponite Basic Red R1 C.I. 45160 conjugate, Saponite C.I. Basic Black 2 conjugate and mixtures thereof.

Suitable pigments include pigments selected from the group consisting of flavanthrone, indanthrone, chlorinated indanthrone containing from 1 to 4 chlorine atoms, pyranthrone, dichloropyranthrone, monobromodichloropyranthrone, dibromodichloropyranthrone, tetrabromopyranthrone, perylene-3,4,9,10-tetracarboxylic acid diimide, wherein the imide groups may be unsubstituted or substituted by C1-C3-alkyl or a phenyl or heterocyclic radical, and wherein the phenyl and heterocyclic radicals may additionally carry substituents which do not confer solubility in water, anthrapyrimidinecarboxylic acid amides, violanthrone, isoviolanthrone, dioxazine pigments, copper phthalocyanine which may contain up to 2 chlorine atoms per molecule, polychloro-copper phthalocyanine or polybromochloro-copper phthalocyanine containing up to 14 bromine atoms per molecule and mixtures thereof.

In another aspect, suitable pigments include pigments selected from the group consisting of Ultramarine Blue (C.I. Pigment Blue 29), Ultramarine Violet (C.I. Pigment Violet 15) and mixtures thereof.

The aforementioned fabric hueing agents can be used in combination (any mixture of fabric hueing agents can be used).

Catalytic Metal Complexes—Applicants' compositions may include catalytic metal complexes. One type of metal-containing bleach catalyst is a catalyst system comprising a transition metal cation of defined bleach catalytic activity, such as copper, iron, titanium, ruthenium, tungsten, molybdenum, or manganese cations, an auxiliary metal cation having little or no bleach catalytic activity, such as zinc or aluminum cations, and a sequestrate having defined stability constants for the catalytic and auxiliary metal cations, particularly ethylenediaminetetraacetic acid, ethylenediaminetetra (methyl-enephosphonic acid) and water-soluble salts thereof. Such catalysts are disclosed in U.S. Pat. No. 4,430,243.

If desired, the compositions herein can be catalyzed by means of a manganese compound. Such compounds and levels of use are well known in the art and include, for example, the manganese-based catalysts disclosed in U.S. Pat. No. 5,576,282.

Cobalt bleach catalysts useful herein are known, and are described, for example, in U.S. Pat. Nos. 5,597,936 and 5,595,967. Such cobalt catalysts are readily prepared by known procedures, such as taught for example in U.S. Pat. Nos. 5,597,936, and 5,595,967.

Compositions herein may also suitably include a transition metal complex of a macropolycyclic rigid ligand—abbreviated as "MRL". As a practical matter, and not by way of limitation, the compositions and cleaning processes herein can be adjusted to provide on the order of at least one part per hundred million of the benefit agent MRL species in the aqueous washing medium, and may provide from about 0.005 ppm to about 25 ppm, from about 0.05 ppm to about 10 ppm, or even from about 0.1 ppm to about 5 ppm, of the MRL in the wash liquor.

Preferred transition-metals in the instant transition-metal bleach catalyst include manganese, iron and chromium. Preferred MRL's herein are a special type of ultra-rigid ligand that is cross-bridged such as 5,12-diethyl-1,5,8,12-tetraazabicyclo[6.6.2]hexa-decane.

Suitable transition metal MRLs are readily prepared by known procedures, such as taught for example in WO 00/32601, and U.S. Pat. No. 6,225,464.

Suitable thickeners/structurants and useful levels of same are described in U.S. Patent Application Publication No. 2005/0130864 A1 and U.S. Pat. Nos. 7,169,741 B2 and 7,297,674 B2. In one aspect, the thickener may be a rheology modifier. The rheology modifier may be selected from the group consisting of non-polymeric crystalline, hydroxy-functional materials, polymeric rheology modifiers which impart shear thinning characteristics to the aqueous liquid matrix of the composition. In one aspect, such rheology modifiers impart to the aqueous liquid composition a high shear viscosity, at 20 sec$^{-1}$ shear rate and at 21° C., of from 1 to 7,000 cps and a viscosity at low shear (0.5 sec$^{-1}$ shear rate at 21° C.) of greater than 1000 cps, or even 1,000 cps to 200,000 cps. In one aspect, for cleaning and treatment compositions, such rheology modifiers impart to the aqueous liquid composition a high shear viscosity, at 20 sec$^{-1}$ and at 21° C., of from 50 to 3,000 cps and a viscosity at low shear (0.5 sec$^{-1}$ shear rate at 21° C.) of greater than 1,000 cps, or even 1,000 cps to 200,000 cps. Viscosity according to the present invention is measured using an AR 2000 rheometer from TA instruments using a plate steel spindle having a plate diameter of 40 mm and a gap size of 500 µm. The high shear viscosity at 20 sec$^{-1}$ and low shear viscosity at 0.5 sec$^{-1}$ can be obtained from a logarithmic shear rate sweep from 0.1 sec$^{-1}$ to 25 sec$^{-1}$ in 3 minutes time at 21° C. Crystalline hydroxyl functional materials are rheology modifiers which form thread-like structuring systems throughout the matrix of the composition upon in situ crystallization in the matrix. Polymeric rheology modifiers are selected from the group consisting of polyacrylates, polymeric gums, other non-gum polysaccharides, and combinations of these polymeric materials.

Generally, the rheology modifier will comprise from about 0.01% to about 1% by weight, from about 0.05% to about 0.75% by weight, or even from about 0.1% to about 0.5% by weight, of the compositions herein.

Structuring agents which are especially useful in the compositions of the present invention comprises non-polymeric (except for conventional alkoxylation), crystalline hydroxy-functional materials which can form thread-like structuring systems throughout the liquid matrix when they are crystallized within the matrix in situ. Such materials can be generally characterized as crystalline, hydroxyl-containing fatty acids, fatty esters or fatty waxes. In one aspect, rheology modifiers include crystalline, hydroxyl-containing rheology modifiers include castor oil and its derivatives. In one aspect, rheology modifiers may include hydrogenated castor oil derivatives such as hydrogenated castor oil and hydrogenated castor wax. Commercially available, castor oil-based, crystalline, hydroxyl-containing rheology modifiers include THIXCIN™ from Rheox, Inc. (now Elementis).

Other types of rheology modifiers, besides the non-polymeric, crystalline, hydroxyl-containing rheology modifiers described heretofore, may be utilized in the liquid detergent compositions herein. Polymeric materials which provide shear-thinning characteristics to the aqueous liquid matrix may also be employed.

Suitable polymeric rheology modifiers include those of the polyacrylate, polysaccharide or polysaccharide derivative type. Polysaccharide derivatives typically used as rheology modifiers comprise polymeric gum materials. Such gums include pectine, alginate, arabinogalactan (gum Arabic), carrageenan, gellan gum, xanthan gum and guar gum.

If polymeric rheology modifiers are employed herein, a preferred material of this type is gellan gum. Gellan gum is a heteropolysaccharide prepared by fermentation of *Pseudomonaselodea* ATCC 31461. Gellan gum is commercially marketed by CP Kelco U.S., Inc. under the KELCO-GEL tradename.

A further alternative and suitable rheology modifier include a combination of a solvent and a polycarboxylate polymer. More specifically the solvent may be an alkylene glycol. In one aspect, the solvent may comprise dipropylene glycol. In one aspect, the polycarboxylate polymer may comprise a polyacrylate, polymethacrylate or mixtures thereof. In one aspect, solvent may be present, based on total composition weight, at a level of from 0.5% to 15%, or from 2% to 9% of the composition. In one aspect, polycarboxylate polymer may be present, based on total composition weight, at a level of from 0.1% to 10%, or from 2% to 5%. In one aspect, the solvent component may comprise mixture of dipropylene glycol and 1,2-propanediol. In one aspect, the ratio of dipropylene glycol to 1,2-propanediol may be 3:1 to 1:3, or even 1:1. In one aspect, the polyacrylate may comprise a copolymer of unsaturated mono- or di-carbonic acid and $C_1$-$C_{30}$ alkyl ester of the (meth)acrylic acid. In another aspect, the rheology modifier may comprise a polyacrylate of unsaturated mono- or di-carbonic acid and $C_1$-$C_{30}$ alkyl ester of the (meth)acrylic acid. Such copolymers are available from Noveon Inc under the tradename Carbopol Aqua 30®. In the absence of rheology modifier and in order to impart the desired shear thinning characteristics to the liquid composition, the liquid composition can be internally structured through surfactant phase chemistry or gel phases.

UV Absorbers—in certain consumer product embodiments of the present invention, the photo-responsive encapsulates of the present invention may be stabilized against premature release by exposure to light of a sufficient wavelength during storage by incorporation of a suitable UV-absorbing ingredients into the composition. Any suitable UV-absorbing composition may be employed, but particularly preferred are those which do not impart an unpleasant color or odor to the composition, and which do not adversely affect the rheology of the product. Non-limiting examples of UV-absorbing ingredients include avobenzone, cinoxate, ecamsule, menthyl anthranilate, octyl methoxycinnamate, octyl salicylate, oxybenzone, sulisobenzone, and combinations thereof. Other suitable UV-absorbing ingredients are disclosed in U.S. Pat. No. 6,159,918, which is incorporated herein by reference. Applicants have surprisingly found that the use of such UV-absorbing ingredients do not compromise the light-activated performance of encapsulates of the present invention. Without wishing to be bound by theory, it is believed that in many consumer product applications, e.g., cleaning compositions including laundry detergents, shampoos and body washes, the UV absorbing ingredient is washed down the drain while the encapsulates of the present invention are retained in an efficacious amount on the surface of interest where they are available to release their contents on subsequent exposure to light of a sufficient wavelength. In other cleaning compositions or leave-on consumer products, e.g., floor cleaning compositions, drapery and upholstery refreshers, body lotions, and hair styling products, it is believed that the UV-absorbing ingredients dry down to a thin film after application, allowing the encapsulates of the present invention to sit atop or extend above the film. This allows and efficacious amount of light of the desired wavelength to reach the encapsulates and effect the release of the benefit agents.

EXAMPLES

Silicone Antifoam Agent A

Silicone antifoam agent A was prepared by charging a 100 ml flask equipped with a stirrer with 22.75 g of a copolymer having a molecular weight of approximately 35,300 and comprising, 83-85 mole % dimethylsiloxane groups, 15-17 mole % diphenylsiloxane groups, terminated with a vinyl group[1], and 6 g of an organosiloxane resin[2] having trimethyl siloxane units and $SiO_2$ units in a M/Q ratio of about 0.65/1 to 0.67/1 dissolved in 2-ethylhexyl stearate[3]. The mixture was stirred until complete incorporation of the resin mixture. Then 2.25 g of precipitated silica[4] and 0.75 g of fumed silica[5] was added and the mixture stirred until complete incorporation of the silica was achieved.

Silicone Antifoam Agent B

Silicone antifoam agent B was prepared by charging a 100 ml flask equipped with a stirrer with 18.2 g of a copolymer having a molecular weight of approximately 35,300 and comprising 83-85 mole % dimethylsiloxane groups, 15-17 mole % diphenylsiloxane groups, terminated with a vinyl group[1], 4.6 g of a polydimethylsilloxane, trimethylsiloxy terminated, having a molecular weight of approximately 62,700[1] and 6 g of an organosiloxane resin[2] having trimethyl siloxane units and $SiO_2$ units in a M/Q ratio of about 0.65/1 to 0.67/1, dissolved in 2-ethylhexyl stearate (50% resin). The mixture was stirred until complete incorporation of the resin mixture. Then 2.25 g of precipitated silica[5] and 0.75 g of fumed silica[5] was added and the mixture stirred until complete incorporation of the silica was achieved.

Silicone Antifoam Agent C

Silicone antifoam agent C was prepared by charging a 100 ml flask equipped with a stirrer with 18.2 g of a copolymer having a viscosity of approximately 500 cSt (25° C.) and comprising 38-42 mole % dimethylsiloxane groups and 58-62 mole % phenylmethylsiloxane groups, trimethylsiloxy terminated[1], 4.6 g of a polydimethylsiloxane, trimethylsiloxy terminated, having a molecular weight of approximately 62,700, and 6 g of an organosiloxane resin[2] having trimethyl siloxane units and $SiO_2$ units in a M/Q ratio of about 0.65/1 to 0.67/1 dissolved in 2-ethylhexyl stearate[3] (50% resin). The mixture was stirred until complete incorporation of the resin mixture. Then 2.25 g of precipitated silica[4] and 0.75 g of fumed silica[5] was added and the mixture stirred until complete incorporation of the silica was achieved.

[1] Supplied by Gelest Inc., Morrisville, Pa.
[2] Supplied by Wacker Silicones, Adrian, Mich. under the trade name Belsil 803
[3] Supplied by Aldrich Chemicals, Milwaukee, Wis.
[4] Available from Evonik Degussa Corporation, Parsippany, N.J.
[5] Available from Evonik Degussa Corporation, Parsippany, N.J.

Formulation Example 1

Liquid Detergent Fabric Care Compositions

Liquid detergent fabric care composition 1A-1E are made by mixing together the ingredients listed in the proportions shown:

| Ingredient (wt %) | 1A | 1B | 1C | 1D | 1E |
|---|---|---|---|---|---|
| $C_{12}$-$C_{15}$ alkyl polyethoxylate (1.8) sulfate[1] | 20.1 | 16.6 | 14.7 | 13.9 | 8.2 |
| $C_{11.8}$ linear alkylbenzene sulfonic acid[2] | — | 4.9 | 4.3 | 4.1 | 8.2 |
| $C_{16}$-$C_{17}$ branched alkyl sulfate[1] | — | 2.0 | 1.8 | 1.6 | — |
| $C_{12}$ alkyl trimethyl ammonium chloride[4] | 2.0 | | — | — | — |
| $C_{12}$ alkyl dimethyl amine oxide[5] | | 0.7 | 0.6 | — | — |
| $C_{12}$-$C_{14}$ alcohol 9 ethoxylate[3] | 0.3 | 0.8 | 0.9 | 0.6 | 0.7 |
| $C_{15}$-$C_{16}$ branched alcohol -7 ethoxylate[1] | — | — | — | — | 4.6 |
| 1,2 Propane diol[6] | 4.5 | 4.0 | 3.9 | 3.1 | 2.3 |
| Ethanol | 3.4 | 2.3 | 2.0 | 1.9 | 1.2 |
| $C_{12}$-$C_{18}$ Fatty Acid[5] | 2.1 | 1.7 | 1.5 | 1.4 | 3.2 |
| Citric acid[7] | 3.4 | 3.2 | 3.5 | 2.7 | 3.9 |
| Protease[7] (32 g/L) | 0.42 | 1.3 | 0.07 | 0.5 | 1.12 |
| Fluorescent Whitening Agent[8] | 0.08 | 0.2 | 0.2 | 0.17 | 0.18 |
| Diethylenetriamine pentaacetic acid[6] | 0.5 | 0.3 | 0.3 | 0.3 | 0.2 |
| Ethoxylated polyamine[9] | 0.7 | 1.8 | 1.5 | 2.0 | 1.9 |
| Grease Cleaning Alkoxylated Polyalkylenimine Polymer[10] | — | — | 1.3 | 1.8 | — |
| Zwitterionic ethoxylated quaternized sulfated hexamethylene diamine[11] | — | 1.5 | — | — | 0.8 |
| Hydrogenated castor oil[12] | 0.2 | 0.2 | | 0.12 | 0.3 |
| Copolymer of acrylamide and methacrylamidopropyl trimethylammonium chloride[13] | 0.3 | 0.2 | 0.3 | 0.1 | 0.3 |
| Antifoam of any of Examples A-C (mixtures thereof may also be used) | 0.2 | 0.1 | 0.2 | 0.2 | 0.2 |
| Water, perfumes, dyes, buffers, solvents and other optional components | to 100% pH 8.0-8.2 | to 100% pH 8.0-8.2 | to 100% pH 8.0-8.2 | to 100% pH 8.0-8.2 | to 100% pH 8.0-8.2 |

Formulation Example 2

Liquid or Gel Detergents

Liquid or gel detergent fabric care compositions 2A-2E are prepared by mixing the ingredients listed in the proportions shown:

| Ingredient (wt %) | 2A | 2B | 2C | 2D | 2E |
|---|---|---|---|---|---|
| $C_{12}$-$C_{15}$ alkyl polyethoxylate (3.0) sulfate[1] | 8.5 | 2.9 | 2.9 | 2.9 | 6.8 |
| $C_{11.8}$ linear alkylbenzene sulfonic acid[2] | 11.4 | 8.2 | 8.2 | 8.2 | 1.2 |
| $C_{14}$-$C_{15}$ alkyl 7-ethoxylate[1] | — | 5.4 | 5.4 | 5.4 | 3.0 |
| $C_{12}$-$C_{14}$ alkyl 7-ethoxylate[3] | 7.6 | — | — | — | 1.0 |
| 1,2 Propane diol | 6.0 | 1.3 | 1.3 | 6.0 | 0.2 |
| Ethanol | — | 1.3 | 1.3 | — | 1.4 |

-continued

| Ingredient (wt %) | 2A | 2B | 2C | 2D | 2E |
|---|---|---|---|---|---|
| Di Ethylene Glycol | 4.0 | — | — | — | — |
| Na Cumene Sulfonate | — | 1.0 | 1.0 | 0.9 | — |
| $C_{12}$-$C_{18}$ Fatty Acid[5] | 9.5 | 3.5 | 3.5 | 3.5 | 4.5 |
| Citric acid | 2.8 | 3.4 | 3.4 | 3.4 | 2.4 |
| Protease (40.6 mg/g/)[7] | 1.0 | 0.6 | 0.6 | 0.6 | 0.3 |
| Natalase 200 L (29.26 mg/g)[14] | — | 0.1 | 0.1 | 0.1 | — |
| Termamyl Ultra (25.1 mg/g)[14] | 0.7 | 0.1 | 0.1 | 0.1 | 0.1 |
| Mannaway 25 L (25 mg/g)[14] | 0.1 | 0.1 | 0.1 | 0.1 | 0.02 |
| Whitezyme (20 mg/g)[14] | 0.2 | 0.1 | 0.1 | 0.1 | — |
| Fluorescent Whitening Agent[8] | 0.2 | 0.1 | 0.1 | 0.1 | — |
| Diethylene Triamine Penta Methylene Phosphonic acid | — | 0.3 | 0.3 | 0.3 | 0.1 |
| Hydroxy Ethylidene 1,1 Di Phosphonic acid | 1.5 | — | — | — | — |
| Zwitterionic ethoxylated quaternized sulfated hexamethylene diamine[11] | 2.1 | 1.0 | 1.0 | 1.0 | 0.7 |
| Grease Cleaning Alkoxylated Polyalkylenimine Polymer[10] | — | 0.4 | 0.4 | 0.4 | — |
| PEG-PVAc Polymer[15] | 0.9 | 0.5 | 0.5 | 0.5 | — |
| Hydrogenated castor oil[12] | 0.8 | 0.4 | 0.4 | 0.4 | 0.3 |
| Borate | — | 1.3 | — | — | 1.2 |
| 4 Formyl Phenyl Boronic Acid | — | — | 0.025 | — | — |
| Antifoam of any of the Examples A-C. | 0.4 | 0.3 | 0.3 | 0.2 | 0.3 |
| Water, perfumes, dyes, buffers, neutralizers, stabilizers and other optional components | to 100% pH 8.0-8.2 | to 100% pH 8.0-8.2 | to 100% pH 8.0-8.2 | to 100% pH 8.0-8.2 | to 100% pH 8.0-8.2 |

[1]Available from Shell Chemicals, Houston, TX.
[2]Available from Huntsman Chemicals, Salt Lake City, UT.
[3]Available from Sasol Chemicals, Johannesburg, South Africa
[4]Available from Evonik Corporation, Hopewell, VA.
[5]Available from The Procter & Gamble Company, Cincinnati, OH.
[6]Available from Sigma Aldrich chemicals, Milwaukee, WI
[7]Available from Genencor International, South San Francisco, CA.
[8]Available from Ciba Specialty Chemicals, High Point, NC
[9]600 g/mol molecular weight polyethylenimine core with 20 ethoxylate groups per —NH and available from BASF (Ludwigshafen, Germany)
[10]600 g/mol molecular weight polyethylenimine core with 24 ethoxylate groups per —NH and 16 propoxylate groups per —NH. Available from BASF (Ludwigshafen, Germany).
[11]Described in WO 01/05874 and available from BASF (Ludwigshafen, Germany)
[12]Available under the tradename ThixinR from Elementis Specialties, Highstown, NJ
[13]Available from Nalco Chemicals, Naperville, IL.
[14]Available from Novozymes, Copenhagen, Denmark.
[15]PEG-PVA graft copolymer is a polyvinyl acetate grafted polyethylene oxide copolymer having a polyethylene oxide backbone and multiple polyvinyl acetate side chains. The molecular weight of the polyethylene oxide backbone is about 6000 and the weight ratio of the polyethylene oxide to polyvinyl acetate is about 40 to 60 and no more than 1 grafting point per 50 ethylene oxide units. Available from BASF (Ludwigshafen, Germany).

Formulation Example 3

Rinse-Added Fabric Care Compositions

Rinse-Added fabric care compositions 3A-3D are prepared by mixing together ingredients shown below:

| Ingredient | 3A | 3B | 3C | 3D |
|---|---|---|---|---|
| Fabric Softener Active[1] | 16.2 | 11.0 | 16.2 | — |
| Fabric Softener Active[2] | — | — | — | 5.0 |
| Cationic Starch[3] | 1.5 | — | 1.5 | — |
| Polyethylene imine[4] | 0.25 | 0.25 | — | — |
| Quaternized polyacrylamide[5] | — | — | 0.25 | 0.25 |
| Calcium chloride | 0.15 | 0. | 0.15 | — |
| Ammonium chloride | 0.1 | 0.1 | 0.1 | — |
| Antifoam of any of the Examples A-C | 0.1 | 0.1 | 0.1 | 0.1 |
| Perfume | 0.85 | 2.0 | 0.85 | 1.0 |
| Perfume microcapsule[6] | 0.65 | 0.75 | 0.65 | 0.3 |
| Water, suds suppressor, | to 100% | to 100% | to 100% | to 100% |

|Ingredient|3A|3B|3C|3D|
|---|---|---|---|---|
|stabilizers, pH control agents, buffers, dyes & other optional ingredients|pH = 3.0|pH = 3.0|pH = 3.0|pH = 3.0|

[1] N,N di(tallowoyloxyethyl)-N,N dimethylammonium chloride available from Evonik Corporation, Hopewell, VA.
[2] Reaction product of fatty acid with Methyldiethanolamine, quaternized with Methylchloride, resulting in a 2.5:1 molar mixture of N,N-di(tallowoyloxyethyl) N,N-dimethylammonium chloride and N-(tallowoyloxyethyl) N-hydroxyethyl N,N-dimethylammonium chloride available from Evonik Corporation, Hopewell, VA.
[3] Cationic starch based on common maize starch or potato starch, containing 25% to 95% amylose and a degree of substitution of from 0.02 to 0.09, and having a viscosity measured as Water Fluidity having a value from 50 to 84. Available from National Starch, Bridgewater, NJ
[4] Available from Nippon Shokubai Company, Tokyo, Japan under the trade name Epomin 1050.
[5] Cationic polyacrylamide polymer such as a copolymer of acrylamide/[2-(acryloylamino)ethyl]tri-methylammonium chloride (quaternized dimethyl aminoethyl acrylate) available from BASF, AG, Ludwigshafen under the trade name Sedipur 544.
[6] Available from Appleton Paper of Appleton, WI The dimensions and values disclosed herein are not to be understood as being strictly limited to the exact numerical values recited. Instead, unless otherwise specified, each such dimension is intended to mean both the recited value and functionally equivalent range surrounding that value. For example, a dimension disclosed as "40 mm" is intended to mean "about 40 mm".

All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A composition, comprising a polymer, having a number average molecular weight of from about 200 Daltons to about 10,000,000 Daltons, that comprises from about 50 mol % to about 100 mol % units of Formula (I) below,

$$R_a(R^1O)_b R^2{}_c SiO_{(4-a-b-c)/2}$$ Formula (I)

wherein:
a) each R is independently selected from: H, a monovalent, SiC-bonded, optionally substituted, aliphatic hydrocarbon radical that optionally comprises a heteroatom, or an aromatic hydrocarbon radical covalently attached to silicon via aliphatic groups;
b) each $R^1$ is independently selected from: H, or a monovalent, optionally substituted aliphatic hydrocarbon radical, that optionally comprises a heteroatom;
c) each $R^2$ is a monovalent, optionally substituted, aromatic hydrocarbon radical which is attached to the silicon atom via a carbon ring atom,
d) the index a is 0, 1, 2 or 3;
e) the index b is 0, 1, 2 or 3;
f) the index c is 0, 1, 2 or 3; and
optionally a filler and a resin;
with the proviso for said polymer that for each of said polymer's Formula I units the sum of indices a, b, and c is less than or equal to 3; in 1-100% of said polymer's Formula (I) units, c is other than 0; and in at least 50% of said polymer's Formula I units the sum of indices a, b, and c is 2 said composition having a viscosity, at a shear rate of 20 sec$^{-1}$ at 25° C., of from about 10 cPs to about 50,000 cPs and comprising from about 1% to about 60%, of a surfactant selected from the group consisting of anionic surfactant, cationic surfactant, nonionic surfactant, zwitterionic surfactant, ampholytic surfactant and mixtures thereof.

2. The composition of claim 1 wherein said polymer, has a number average molecular weight of from about 500 Daltons to about 1,000,000 Daltons, that comprises from about 70 mol % to about 100 mol %, units of Formula (I) with the proviso for said polymer that for each of said polymer's Formula I units the sum of indices a, b, and c is less than or equal to 3; in 10-60% of said polymer's Formula (I) units, c is other than 0; and in at least 50% of said polymer's Formula I units the sum of indices a, b, and c is 2.

3. The composition of claim 1 wherein said polymer, has a number average molecular weight of from about 1,000 Daltons to about 500,000 Daltons, that comprises from about 80 mol % to about 100 mol % units of Formula (I) with the proviso for said polymer that for each of said polymer's Formula I units the sum of indices a, b, and c is less than or equal to 3; in 20-40% of said polymer's Formula (I) units, c is other than 0; and in at least 50% of said polymer's Formula I units the sum of indices a, b, and c is 2.

4. The composition of claim 1 wherein said polymer, has a number average molecular weight of from about from about 1,500 Daltons to about 100,000 Daltons, that comprises from about 90 mol % to about 100 mol % units of Formula (I) with the proviso for said polymer that for each of said polymer's Formula I units the sum of indices a, b, and c is less than or equal to 3; in 20-40% of said polymer's Formula (I) units, c is other than 0; and in at least 50% of said polymer's Formula I units the sum of indices a, b, and c is 2.

5. The composition of claim 1 wherein for:
a) each R group of said polymer:
i) each monovalent, SiC-bonded, optionally substituted, aliphatic hydrocarbon radical that optionally comprises a heteroatom is independently selected from methyl, ethyl, n-propyl, isopropyl, n-butyl, isobutyl, tert-butyl, n-pentyl, isopentyl, neopentyl, tert-pentyl, hexyl, heptyl, octyl, isooctyl, nonyl, decyl, dodecyl, alkenyl, cycloalkyl, 3,3,3-trifluoro-n-propyl, cyanoethyl, glycidyloxy-n-propyl, polyalkylene glycol-n-propyl, amino-n-propyl, aminoethylamino-n-propyl, and methacryloyloxy-n-propyl,
ii) each aromatic hydrocarbon radical covalently attached to silicon via aliphatic groups is independently selected from benzyl, phenylethyl, or 2-phenylpropyl, b) each R¹ group of said polymer each monovalent, optionally substituted, aliphatic hydrocarbon radical that optionally comprises a heteroatom is independently selected from methyl, ethyl, n-propyl, isopropyl, n-butyl, isobutyl, tert-butyl, n-pentyl, isopentyl, neopentyl, tert-pentyl, hexyl, heptyl, octyl, isooctyl, nonyl, decyl, dodecyl, alkenyl, cycloalkyl, 3,3,3-trifluoro-n-propyl, cyanoethyl, glycidyloxy-n-propyl, polyalkylene glycol-n-propyl, amino-n-propyl, aminoethylamino-n-propyl, and methacryloyloxy-n-propyl, c) each R² group of said polymer is independently selected from phenyl, substituted phenyl, naphthyl, or anthracyl.

6. The composition of claim 5 wherein for each R² group of said polymer is independently selected from phenyl, toloyl, xylyl, cumyl, naphthyl or anthracyl.

7. The composition of claim 6 wherein for each R² group of said polymer is independently selected from phenyl or toloyl.

8. The composition of claim 1 wherein the index b is 0 or 1, and the index c is 0, 1, or 2.

9. The composition of claim 1 comprising said resin and said filler, said filler having a BET surface area of 20 to 1000 m²/g, a particle size of less than 10 μm and an agglomerate size of less than 100 μm.

10. The composition of claim 9 wherein said filler is selected from the group consisting of silica, titanium dioxide, aluminum oxide, metal soaps, quartz flour, PTFE powders, fatty acid amides, ethylenebisstearamide, or hydrophobic polyurethanes.

11. The composition of claim 10 wherein said filler comprises hydrophobic, precipitated silica and/or hydrophobic, fumed silica.

12. A composition according to claim 9 comprising an anionic surfactant.

13. A composition according to claim 10 wherein said anionic surfactant is selected from the group consisting of a C₁₁-C₁₈ alkyl benzene sulfonate surfactant; a C₁₀-C₂₀ alkyl sulfate surfactant; a C₁₀-C₁₈ alkyl alkoxy sulfate surfactant, said C₁₀-C₁₈ alkyl alkoxy sulfate surfactant having an average degree of alkoxylation of from 1 to 30 and the alkoxy comprises a C₁-C₄ chain, and mixtures thereof.

14. A composition according to claim 1 comprising one or more adjuncts selected from the group consisting of builders, chelating agents, dye transfer inhibiting agents, dispersants, enzymes, and enzyme stabilizers, catalytic materials, bleach, bleach activators, polymeric dispersing agents, clay soil removal/anti-redeposition agents, brighteners, suds suppressors, dyes, hueing agents, UV absorbers, perfume, perfume delivery systems, structure elasticizing agents, thickeners/structurants, fabric softeners, carriers, hydrotropes, processing aids and/or pigments.

15. A composition, comprising a polymer, having a number average molecular weight of from about 200 Daltons to about 10,000,000 Daltons, that comprises from about 50 mol % to about 100 mol % units of Formula (I) below, $$R_a(R^1O)_b R^2_c SiO_{(4-a-b-c)/2}$$ Formula (I)

wherein:
a) each R is independently selected from: H, a monovalent, SiC-bonded, optionally substituted, aliphatic hydrocarbon radical that optionally comprises a heteroatom, or an aromatic hydrocarbon radical covalently attached to silicon via aliphatic groups;

b) each R¹ is independently selected from: H, or a monovalent, optionally substituted aliphatic hydrocarbon radical, that optionally comprises a heteroatom;

c) each R² is a monovalent, optionally substituted, aromatic hydrocarbon radical which is attached to the silicon atom via a carbon ring atom, d) the index a is 0, 1, 2 or 3;
e) the index b is 0, 1, 2 or 3;
f) the index c is 0, 1, 2 or 3;

with the proviso for said polymer that for each of said polymer's Formula I units the sum of indices a, b, and c is less than or equal to 3; in 1-100% of said polymer's Formula (I) units, c is other than 0; and in at least 50% of said polymer's Formula I units the sum of indices a, b, and c is 2;

said composition comprising a filler and a resin and said resin comprising units of Formula (II) below:

$$R^3_d(R^4O)_e SiO_{(4-d-e)/2}$$ Formula (II)

wherein:
a) each R³ is independently selected from H, a monovalent, SiC-bonded, optionally substituted, aliphatic hydrocarbon radical that optionally comprises a heteroatom, or an aromatic hydrocarbon radical covalently attached to silicon via aliphatic groups;

b) each R⁴ is independently selected from H, or a monovalent, optionally substituted aliphatic hydrocarbon radical, that optionally comprises a heteroatom;

c) the index d is 0, 1, 2 or 3; and
d) the index e is 0, 1, 2 or 3;
  with the proviso that the sum of the indices d and e is less than or equal to 3 and in less than 50% of all of the units of the Formula (II) in the organopolysiloxane resin the sum of the indices d and e is 2.

16. A process of making the composition of claim 15 comprising combining a surfactant, optionally one or more adjunct ingredients, and from about 0.001% to about 2% of a composition comprising a polymer having a number average molecular weight of from about 200 Daltons to about 10,000,000 Daltons, that comprises from about 50 mol % to about 100 mol % units of Formula (I) below, $$R_a(R^1O)_b R^2_c SiO_{(4-a-b-c)/2}$$ Formula (I)

wherein:
a) each R is independently selected from: H, a monovalent, SiC-bonded, optionally substituted, aliphatic hydrocarbon radical that optionally comprises a heteroatom, or an aromatic hydrocarbon radical covalently attached to silicon via aliphatic groups;

b) each R¹ is independently selected from: H, or a monovalent, optionally substituted aliphatic hydrocarbon radical, that optionally comprises a heteroatom;

c) each R² is a monovalent, optionally substituted, aromatic hydrocarbon radical which is attached to the silicon atom via a carbon ring atom, d) the index a is 0, 1, 2 or 3;
e) the index b is 0, 1, 2 or 3;
f) the index c is 0, 1, 2 or 3; and optionally a filler and a resin; with the proviso for said polymer that for each of said polymer's Formula I units the sum of the indices a, b, and c is less than or equal to 3; in 1-100% of said polymer's Formula I units, c is other than 0; and in at least 50% of said polymer's Formula I units the sum of the indices a, b, and c is 2.

17. A method of treating and/or cleaning a situs, said method comprising
   a) optionally washing and/or rinsing said situs;
   b) contacting said situs with a composition according to any one of claims 1-11 and 12-15; and
      optionally washing and/or rinsing said situs.

\* \* \* \* \*

UNITED STATES PATENT AND TRADEMARK OFFICE
CERTIFICATE OF CORRECTION

PATENT NO.        : 9,095,787 B2                                          Page 1 of 1
APPLICATION NO.   : 14/059476
DATED             : August 4, 2015
INVENTOR(S)       : Panandiker et al.

It is certified that error appears in the above-identified patent and that said Letters Patent is hereby corrected as shown below:

Claims

Claim 1, Column 17

Line 47, remove -- $R_a(R^1O)_bR^2_{cSiO(4-a-b-c)/2}$ -- and insert -- $R_a(R^1O)_bR^2_cSiO_{(4-a-b-c)/2}$ --.

Signed and Sealed this
Twenty-second Day of December, 2015

Michelle K. Lee
*Director of the United States Patent and Trademark Office*